United States Patent
Goyal et al.

(10) Patent No.: US 12,344,393 B2
(45) Date of Patent: Jul. 1, 2025

(54) INTELLIGENT CABIN MANAGEMENT SYSTEM FOR AUTOMATED CHECK OF BASIC SAFETY NORMS AND IN-FLIGHT SAFETY PROCEDURES

(71) Applicant: B/E Aerospace, Inc., Winston-Salem, NC (US)

(72) Inventors: Nitin Kumar Goyal, Bangalore (IN); Ashutosh Kumar Jha, Bangalore (IN); Ajay Kumar, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 59 days.

(21) Appl. No.: 18/211,889

(22) Filed: Jun. 20, 2023

(65) Prior Publication Data
US 2024/0051677 A1     Feb. 15, 2024

(30) Foreign Application Priority Data
Aug. 9, 2022 (IN) .............................. 202241045520

(51) Int. Cl.
*G08B 21/00*     (2006.01)
*B64D 45/00*     (2006.01)
(Continued)

(52) U.S. Cl.
CPC ................ *B64D 45/00* (2013.01); *B64F 5/60* (2017.01); *G06V 10/764* (2022.01); *G06V 20/59* (2022.01); *H04N 21/2187* (2013.01)

(58) Field of Classification Search
CPC ......... B64D 45/00; B64F 5/60; G06V 10/764; G06V 20/59; H04N 21/2187
(Continued)

(56) References Cited

U.S. PATENT DOCUMENTS 5,555,458 A    9/1996    Arge
6,448,907 B1    9/2002    Naclerio
(Continued)

FOREIGN PATENT DOCUMENTS

CA    2796834 A1    10/2011
CA    2941924 A1    10/2015
(Continued)

OTHER PUBLICATIONS

Extended European Search Report dated Nov. 3, 2023; European Application No. 23190074.7.

*Primary Examiner* — Tai T Nguyen
(74) *Attorney, Agent, or Firm* — Suiter Swantz IP

(57) ABSTRACT

The present disclosure provides embodiments of intelligent cabin management systems and methods. In embodiments, a system includes video cameras for capturing live video streams, an enhancement module for enhancing the live video stream, at least one analytics module for analyzing the enhanced video stream to generate analytics data, and a reporting system for reporting the generated data to at least one of avionics system, crew system and maintenance crew system. The at least one analytics module includes models trained to identify features and reconcile the same against known parameters to determine at least one of compliance and damage. In use, the system alerts crews to issues requiring correction or attention to ensure efficient cabin management.

13 Claims, 6 Drawing Sheets

(51) Int. Cl.
*B64F 5/60* (2017.01)
*G06V 10/764* (2022.01)
*G06V 20/59* (2022.01)
*H04N 21/2187* (2011.01)

(58) Field of Classification Search
USPC .......................................................... 340/945
See application file for complete search history.

(56) References Cited

U.S. PATENT DOCUMENTS

| | | | | |
|---|---|---|---|---|
| 8,373,614 | B2* | 2/2013 | Bigot | G06F 3/1423 |
| | | | | 701/3 |
| 10,296,860 | B2 | 5/2019 | Agrawal et al. | |
| 10,691,955 | B1* | 6/2020 | Correia Gracio | G06N 5/04 |
| 10,839,506 | B1 | 11/2020 | Raghu et al. | |
| 11,640,723 | B2* | 5/2023 | Goyal | G06T 7/194 |
| | | | | 382/118 |
| 2003/0058112 | A1* | 3/2003 | Gleine | B64D 45/0036 |
| | | | | 109/3 |
| 2003/0071743 | A1* | 4/2003 | Seah | B64D 45/0026 |
| | | | | 340/945 |
| 2004/0145498 | A1* | 7/2004 | Carroll | G08B 13/1965 |
| | | | | 340/522 |
| 2004/0195875 | A1 | 10/2004 | Skelly | |
| 2005/0146434 | A1* | 7/2005 | Gaiotto | G08B 13/2417 |
| | | | | 340/8.1 |
| 2006/0163430 | A1 | 7/2006 | Cordina et al. | |
| 2017/0036764 | A1 | 2/2017 | Goyal | |
| 2017/0283086 | A1 | 10/2017 | Garing et al. | |
| 2019/0177004 | A1* | 6/2019 | Skelly | G06T 5/00 |
| 2020/0209891 | A1 | 7/2020 | Gusikhin et al. | |
| 2022/0121838 | A1 | 4/2022 | Goyal et al. | |

FOREIGN PATENT DOCUMENTS

| | | |
|---|---|---|
| FR | 2845953 A1 | 4/2004 |
| JP | 5490965 B2 | 5/2014 |
| WO | 2018185332 A1 | 10/2018 |

* cited by examiner

INTELLIGENT CABIN MANAGEMENT SYSTEM FOR AUTOMATED CHECK OF BASIC SAFETY NORMS AND IN-FLIGHT SAFETY PROCEDURES

CROSS-REFERENCE TO RELATED APPLICATION

This application claims priority to Indian Provisional Application No. 202241045520 filed Aug. 9, 2022, which is hereby incorporated by reference in its entirety.

TECHNICAL FIELD AND BACKGROUND

The present disclosure relates generally to systems for monitoring cabin conditions, and more particularly to the monitoring of cabin safety procedures and routine maintenance requirements of cabin assets, items, and equipment using vision systems and video image analytics methodologies.

Operator flight safety procedures and cabin safety guidelines play a major role in the routine and safe operation of aircraft. Pre-flight, in-flight, and post-flight procedures and checks are highly governed by regulations. Pre-flight regulations require the flight crew to check the cabin to ensure that seats are upright, tray tables are stowed and locked, window shades are open, loose items are stowed, etc. In-flight regulations require the flight crew to ensure that passengers remain in compliance with the cabin indicator lights and lavatory rules. Post-flight regulations require the flight crew to check the emptied cabin to ensure that loose articles have been collected and that equipment appears intact and operational such that damaged equipment can be flagged for service or replacement.

In current cabin solutions, in most cases the flight crew first performs a manual demonstration of safety guidelines and communicates the safety procedures for passengers except when a pre-recorded video is displayed to the passengers. Thereafter, the flight crew is required to check each seat by walking the aisle(s) and performing manual inspection to ensure the upright position of the backrest, closed tray table condition, open position of the window shades, closed and locked condition of the overhead bin doors, etc. It is not unusual for the flight crew to encounter at least a 20% instance of non-compliance, and thus non-compliant item must be addressed, and passengers must be informed and instructed to take corrective action. The same inspection procedure is required each time the seat belt sign is activated in the cabin.

Manual checks are time consuming and tedious and therefore prone to human error. In addition, the time required to perform a single safety check and the time span between safety checks allows items to remain out of compliance for long periods of time. In addition, shortly before take-off and landing there is a window in which the flight crew is required to remain seated and belted for safety and therefore unavailable to monitor the cabin.

While solutions have been developed for automating condition monitoring in cabins, conventional solutions rely on dedicated sensors for each item to be monitored. Thus, for example, seat belt monitoring systems require sensors physically located in the seat belts to determine buckled status, seat monitoring systems require sensors associated with each seat to determine inclination angle or tray table stowage condition, and overhead bin systems require dedicated sensors to determine the latched condition of each overhead bin. While some solutions network the output signals to a crew interface, none utilize broad-based systems and analytics methodologies.

Therefore, what is needed is a broad-based system solution for monitoring a cabin environment to automate safety and compliance checks, identify items for service or replacement, monitor the overall cabin environment, etc.

BRIEF SUMMARY

Broadly, the present disclosure provides vision-based systems for automatically monitoring the condition of items, assets, and conditions in a cabin environment, for instance backrest angles, tray table positions, overhead bin doors, availability of life rafts, service requests from passengers, etc. The solution further enables vision system-based cabin maintenance need evaluation and recommendation generation and supports detection of damaged and degraded cabin assets and equipment such as broken tray tables, damaged seats, partition damage, sidewall cracks, damaged overhead bin doors, broken screens, loose wire, and connectors, etc. The automation eases the cumbersome activity of the flight crew and expedites the taxi, takeoff, and landing (TTOL) procedures and checks required for the safety of passengers. Further, the present systems provide a single point to record information for flight crew review.

In one aspect, the inventive concepts disclosed herein are directed to an intelligent aircraft cabin management system. The system includes a plurality of video cameras for capturing video images of a predetermined portion of an observable area of a passenger cabin and output a live video stream, an enhancement module for enhancing the live video streams, an analytics module analyzing the enhanced video streams to generate analytics data pertaining to at least one of safety procedure compliance and object damage, and a reporting module for reporting status and alerts to systems such as avionics, crew and maintenance crew systems.

In some embodiments, processing circuitry of the reporting module is further configured to output the generated status and alerts to a crew handheld device, either directly or indirectly.

In some embodiments, the avionics system is communicatively coupled to the analytics module and is operable to output at least one of a current flight phase, flight parameters, and commands to the analytics module for consideration when analyzing the enhanced video streams.

In some embodiments, the analytics module includes in memory trained and validated analytics models directed to flight safety procedures and damage analytics and operates to analyze the enhanced video streams according to the trained models to generate the analytics data.

In some embodiments, the analytics module is configured to analyze the enhanced video stream to determine, according to the current flight phase, the position of the at least one object in the observable area, wherein the at least one object is at least one of a seat, a tray table, a seat belt, a window shade, and an overhead bin door, and the position is a taxi, takeoff and landing-compliant position for the at least one object.

In some embodiments, the reporting module is configured to generate the alert when the position of at least one object is non-compliant according to the analytics model directed to flight safety procedures and output the generated alert to the flight crew system of the aircraft as at least one of a visual and an audible alert. In a further embodiment, the reporting module may be also configured to report a calculated severity level of the alert.

In some embodiments, the system further includes in-flight entertainment devices located in the observable area, wherein the processing circuitry of the reporting module is further configured to output the generated alert to the in-flight entertainment device of the passenger seat associated with the generated alert to inform a specific passenger regarding a specific instance of non-compliance.

Inventive aspects of the present disclosure are further directed to a computer-implemented method for intelligent aircraft cabin management. The method includes capturing live video streams of an observable area in a cabin using a plurality of video cameras each assigned to a different portion of the observable area, concentrating and enhancing the captured live video streams, using a concentrator and enhancer module, to produce an enhanced live video stream, and analyzing the enhanced live video stream, using an analytics, to generate analytics data regarding a position of at least one object in the observable area, a working condition of at least one object in the observable area, and a damage condition of at least one object in the observable area. The method continues with classifying, using the analytics module, the generated analytics data, generating, using a reporting module, at least one of a status, an alert, and a report associated with the generated analytics data, and outputting, using the reporting module, the generated at least one status, alert, and report to at least one of an avionics system of the aircraft, a flight crew system of the aircraft, and a maintenance crew system of the aircraft or remote from the aircraft.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Certain modules according to the present disclosure are realized as computer-implemented components and may include hardware processors, programmable logic devices, microcontrollers, memory devices and other hardware components configured to perform the tasks described herein. Other hardware components may include coupled memory devices configured to store instructions executable by one or more hardware processors. Processors may include, but are not limited to, central processing units (CPUs), graphics processing units (GPUs), field programmable gate arrays (FPGAs), application specific integrated circuit (ASICs), and deep processing units (DPUs). Memory devices may include, but are not limited to, random access memory (RAM), read-only memory (ROM) and other memory devices configured to store data and processor instructions for implementing various functionalities described herein. For example, the hardware processor and processing circuitry may execute computer instructions stored in the memory device.

Figure 1:
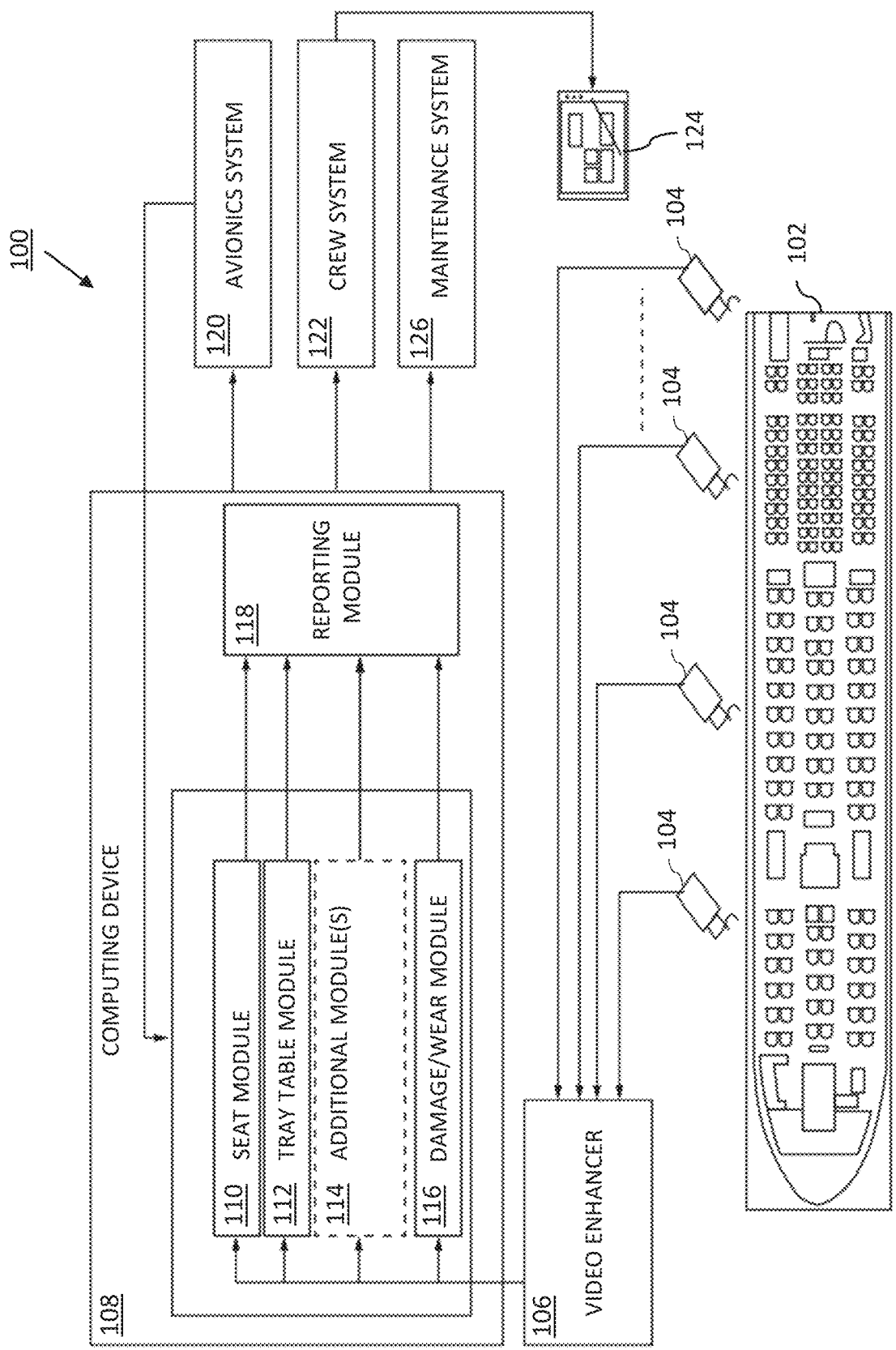
FIG. 1 is a system diagram illustrating an intelligent aircraft cabin monitoring system accordance to the present disclosure.

FIG. 1 illustrates system architecture for an intelligent monitoring system according to the present disclosure. The system 100 is operable to monitor an observable area, for instance an aircraft passenger cabin 102 as shown. At least one video camera 104 is installable in the observable area, and more commonly a plurality of video cameras from camera 1 to camera N considering the size of the observable area. Each video camera 104 is configured to capture and live stream video image of a predetermined portion of the observable area. In an aircraft installation, the predetermined portion may be a zone, seating class, portion of a seating class, section of the fuselage, crew area, aisle, luggage area, or other area in which observation is desired. Each video camera 104 may be a fixed position or scanning type camera depending on the observable area, coverage area of the video camera, obstacles present in the observable area, etc. Each video camera 104 is configured to output a live video stream via a wired or wireless connection. For example, in the case of a wide-body aircraft as shown, at least several video cameras 104 (e.g., camera 1, camera 2, camera 3 . . . camera N) spaced along the length of the fuselage may be necessary to sufficiently image the observable area which may include the passenger seating areas, aisles, galley, lavatories, crew areas, etc.

Each live video stream output from the plurality of video cameras 104 are received and processed by a video stream concentrator and enhancer 106. In some embodiments, the concentrator and enhancer is located in the persistent memory of a computing device 108. The concentrator and enhancer 106 is configured to receive the live video streams and process the same to generally improve the video quality as necessary for better analytic performance. Video enhancements may include, but are not limited to, upscaling, color correction, denoising, deblurring, adding filters, brightness adjustments, stability improvements, cropping, and clipping. Enhancements may be made according to parameters determined by the analytics modules discussed further below.

The system further includes a plurality of analytics modules stored in persistent memory in the computing device 108 and configured to receive the enhanced video streams and analyze the same to generate analytics data as discussed further below. Analytics data may pertain to, but is not limited to, positions of objects in the observable area, conditions of objects, object positions as they relate to safety compliance conditions, damage, and wear. Generated analytics data may be used to, for example, automatically detect and identify seat inclination, tray table positions, locked conditions of objects, seat belt conditions, window cover positions, overhead bin door positions and locked conditions, as well as detect object wear and damage. Generated analytics data may serve as the basis for communications between any of in-flight entertainment devices, flight crew systems, flight crew displays, aircraft systems, maintenance systems, etc.

Pertaining to an aircraft passenger cabin, the analytics modules may include, but are not limited to, a seat analytics module 110 configured to determine seat inclination compliant with a TTOL flight mode, a tray table analytics module 112 configured to determine table stowage compliant with a TTOL flight mode, and additional analytics modules 114 configured to determine a status of different objects within the passenger cabin such as seat belt latch conditions, window shade positions compliant with a TTOL flight mode, overhead bin closure condition and latching compliant with a TTOL flight mode, etc. A further analytics module 116 may include a damage and wear analytics module configured to determine a condition of objects located within the passenger cabin such as seats, tables, controls, shades, overhead bins, carpeting, dress covers, etc. As discussed further below, each analytics module is configured to analyze objects in the field of view of the various live video streams to determine the status of those objects, and in some cases, trigger alerts and reports in response to sensed parameters.

Analyzed data from the analytics modules may be classified according to predetermined classifications and output to a reporting module 118 configured to generate and communicate at least one of status, alerts, and reports in response to the analyzed data. The reporting module 118 is configured to output the generated at least one of a status, alert and report, based on the analyzed data, to at least one remote system (remote with respect to the reporting module) associated with that generated data and configured to utilize and process the data.

A first remote system may include an avionics system 120 of the aircraft. In some embodiments, the avionics system 120 may communicate fight data to the analytics module(s) for consideration in generating the analytics data. Flight information may include, but is not limited to, flight phase, flight parameters, and commands. Flight phases, for example, may include TTOL phases in which certain object positions are required for safety compliance and flight phases in which other object positions are permissible. Commands, for example, may include temporary conditions requiring temporary safety compliance positions.

A second remote system may include a crew system 122. The crew system 122 may be accessible to and utilized by the crew for monitoring the happenings in the passenger cabin. For example, the crew system 122 may be implemented as at least one interface and may be networked to at least one handheld device 124. The interface may be an interactive touch-display located in a central location such as in a galley area separate from passenger areas. The aircraft may be equipped with multiple interface devices each located in a designated area and usable by a portion of the flight crew serving that designated area. In some embodiments, the interface(s) displays the cabin layout and indicates status, alerts, and reports generated by the reporting module 118. For example, a report of non-compliance associated with a particular object may highlight that object to draw attention so that that the non-compliance may be addressed and brought into a compliant condition.

A third remote system may include a maintenance crew system 128 positioned aboard the aircraft or remote from the aircraft. In use, the maintenance crew system 128 is configured to receive at least one of status, alerts, and reports generated by the reporting module 118. For example, in the case of determined damage, the determination may be reported to the maintenance crew system 128 for addressing following the flight or at a later time to be determined. For example, detected damage may be reported associated with an action to replace the damaged object. In some embodiments, certain analytics modules may communicate and convey data with other analytics modules in the system.

Figure 2:
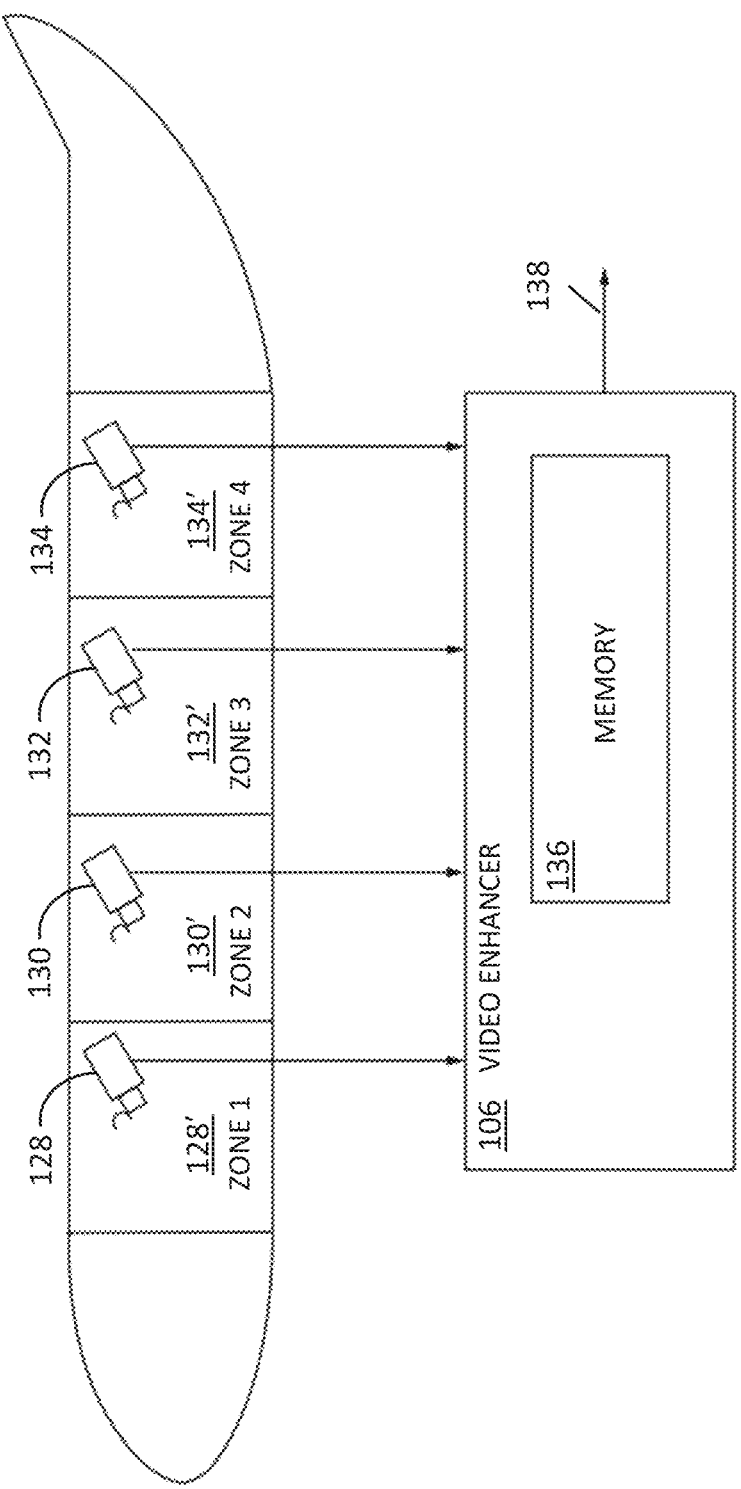
FIG. 2 is a schematic diagram illustrating zoning of cabin space and video stream channel according to the present disclosure.

FIG. 2 illustrates a non-limiting example of an aircraft cabin divided into observable zones depending on the cabin configuration, number of floors, etc. For example, the cabin is divided into a first zone 128' imaged by a first video camera 128, a second zone 130' aft and adjacent the first zone and imaged by a second video camera 130, a third zone 132' aft and adjacent the second zone and images by a third camera 132, and a fourth zone 134' aft of the third zone and imaged by a fourth camera 134. The zones collectively form the total observable area and each individual zone may form a smaller subset of the observable area. Zones may be determined according to a logical division of the monitoring space of the cabin for the installment of the video cameras. The zones are preferably sized such that the number of required video cameras is optimized and minimal. In some applications, zone overlap may be required and/or beneficial to for better imaging. For example, a portion of the first zone 128' imaged by the first camera 128 may also be imaged by the second camera 130 and vice versa. Thus, zone borders may not be discrete boundaries. The logical zoning is configurable and the video streams from the individual video cameras may also be configurable. In embodiments, the video cameras may be visible to the passengers or concealed pin-hole cameras for better placement without interrupting the cabin design and aesthetics.

Each zonal video camera is communicatively coupled to the concentrator and enhancer 106 as discussed above, configured to the concentrate and process the live video streams to be forwarded to the analytics module(s) for further processing. In some embodiments, the concentrator and enhancer 106 is configured to control the video camera performance parameters such as aperture settings, coverage radius, etc., and also channel properties based on zone definition and channel configuration stored in persistent memory 136. The zone definition and channel configurations may also support with stitching of the scene for complete coverage generation and special analytics. The output of the concentrator and enhancer 106 is enhanced video stream for use by the analytics module(s).

Figure 3:
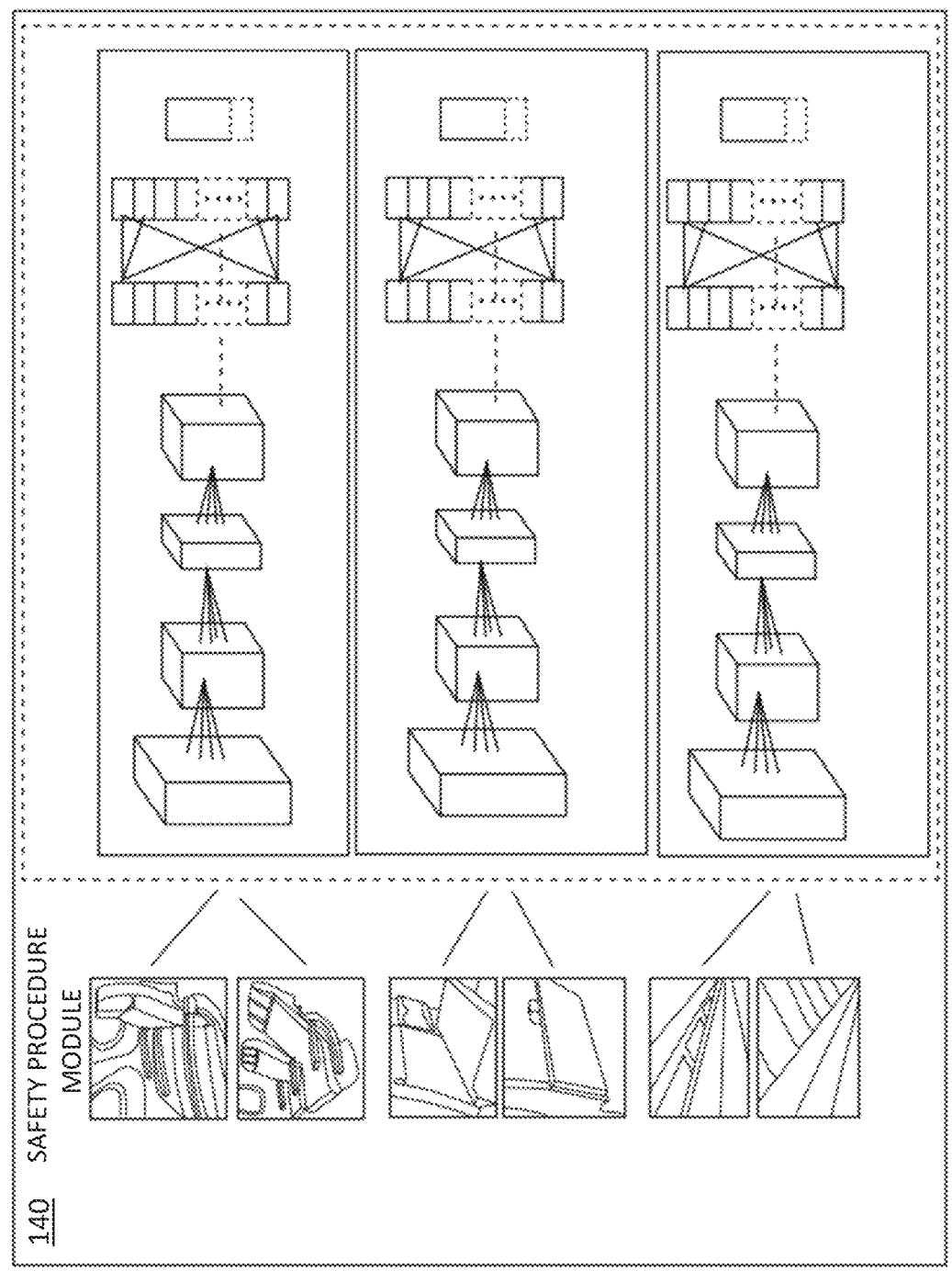
FIG. 3 is a diagram illustrating a training and validation of safety procedures analytics model according to the present disclosure.

FIG. 3 illustrates training and validation associated with safety procedure analytics performed by a safety procedure analytics module 140. Safety procedure analytics may be performed differently according to the different flight phases of the aircraft. For example, in preparation for TTOL, the upright position of the seats, stowed position of the try tables, locked condition of the tray tables, fastened seat beats, open position of the window shades, etc., may be performed automatically by capturing the video from the installed video cameras and performing machine learning based analytics on the enhanced video streams. For example, during flight when the seat belt fastening is indicated the video cameras continue to operate to capture video and analytics is performed to determine the fastened state of the passenger restraints. In addition, the video cameras capture the overhead bins, objects in the aisle and other areas/items of concern and outputs the same in the live video streams to the analytics module in real time.

The safety procedure analytics module 140 performs the programmed analytics and generates data which is then packaged and provided to the flight crew such that appropriate action and management of the situation may occur. In addition, the analytics consider the conditions in the observable area in preparation for landing similar to preparation for takeoff. The different types of analytics may be activated and deactivated automatically according to the flight phase communicated by the avionics system (FIG. 3 at 120). Specific analytics may be activated or deactivated according to an instruction, such as from a command from a crew terminal. In a particular application, the system can be activated to perform a specific task, on demand, such as a search for an object lost in the cabin. In embodiments, the system may be trained to identify different objects within the observable area, such as the aircraft equipment, common objects, suspicious objects, etc.

Safety procedure and analytics models may be developed according to different phases. FIG. 3 illustrates a training and validation phase for the safety procedure analytics. According to the first phase, during training and validation different scenarios for the seat positions, tray table positions, overhead bins, window shades, locks, etc. are fed from a real scenario of the cabin as either recorded data or simulated environment to train the model for classification. Different assets may have different analytics models, and the different analytics models may be enabled and disabled using software configurations.

After training, the trained analytics models may be validated for accuracy by providing new inputs and tested for accuracy of the classification under different scenarios, view angles, cabin lighting conditions, etc. The models may be supplemented with additional training inputs and re-trained and provided with transformational learning until they reach a predetermined performance level, e.g., high accuracy level. The analytics models may also be trained using augmented synthetic data to improve the accuracy of classification for compliance or non-compliance with safety procedures.

Figure 4:
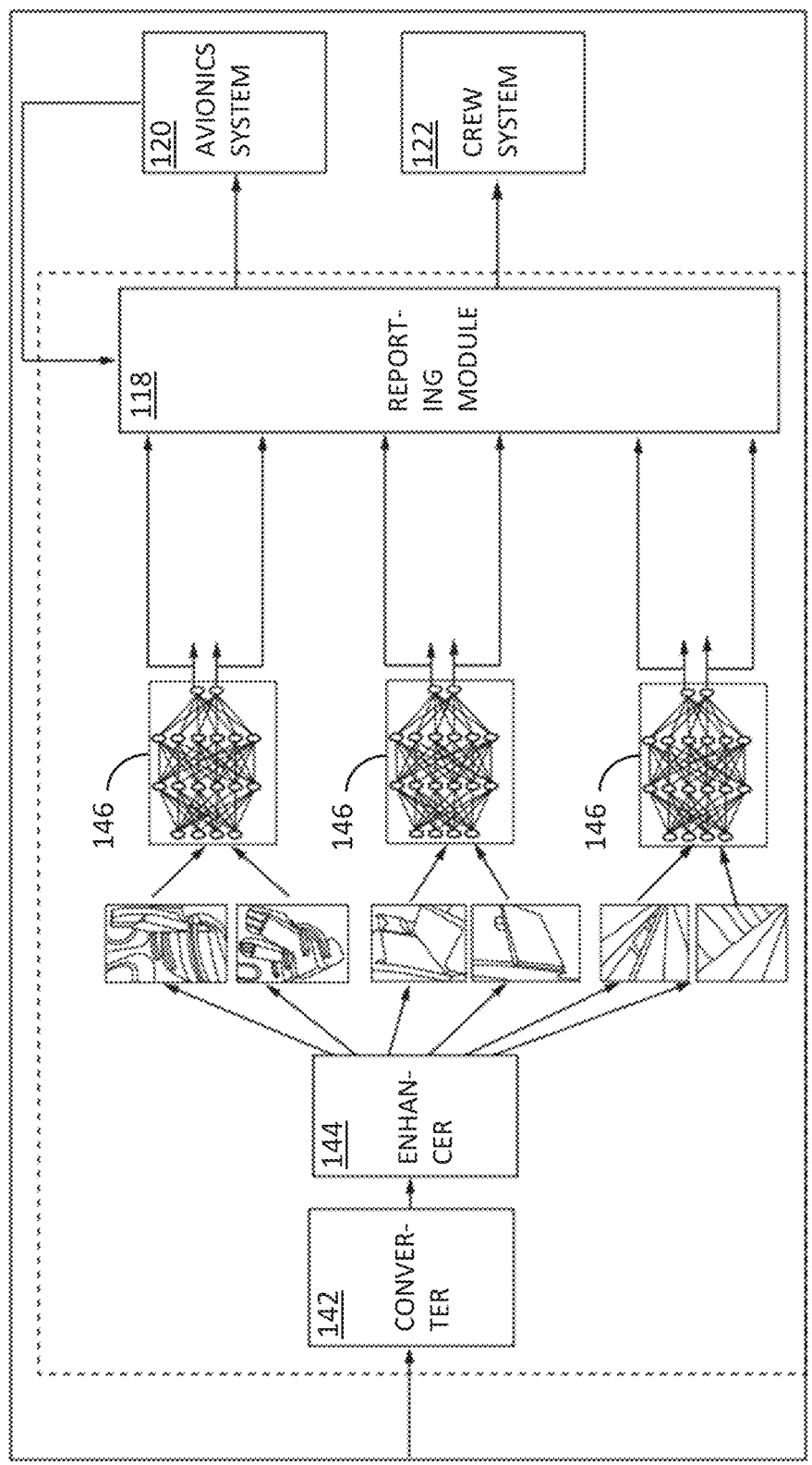
FIG. 4 is a diagram illustrating a real time deployment of safety procedures analytics model according to the present disclosure.

FIG. 4 illustrates a second phase of development of the safety procedure analytics entailing field deployment and functioning. According to the second phase, upon completion of the training and validation phase, the analytics models are mature for field deployment and are uploaded to the analytics module for real time assessment of the safety procedure norms. In the real time scenario, if any non-compliance to safety procedures is identified the crew system is provided with an alert. Details of different types of safety procedure analytics performed include, but are not limited to, seat analytics, tray table analytics, overhead bin analytics, etc. The live video feed is converted from video to image frame by a converter 142 and then enhanced by an enhancer 144, for instance from the concentrator and enhancer discussed above. Analytics models 146 are used to analyze the enhanced video images and generated data includes classifications such as compliance, non-compliance, conditions, positions, open state, closed state, etc. Status, alerts, and reports are generated by the reporting module 118 according to the classification and conveyed to the appropriate system(s), for instance the avionics system 120 and the crew system 122. As discussed above, the analytics modules may consider the information conveyed by the avionics system which is determinative of the type of report and severity associated with the classification.

Figure 5:
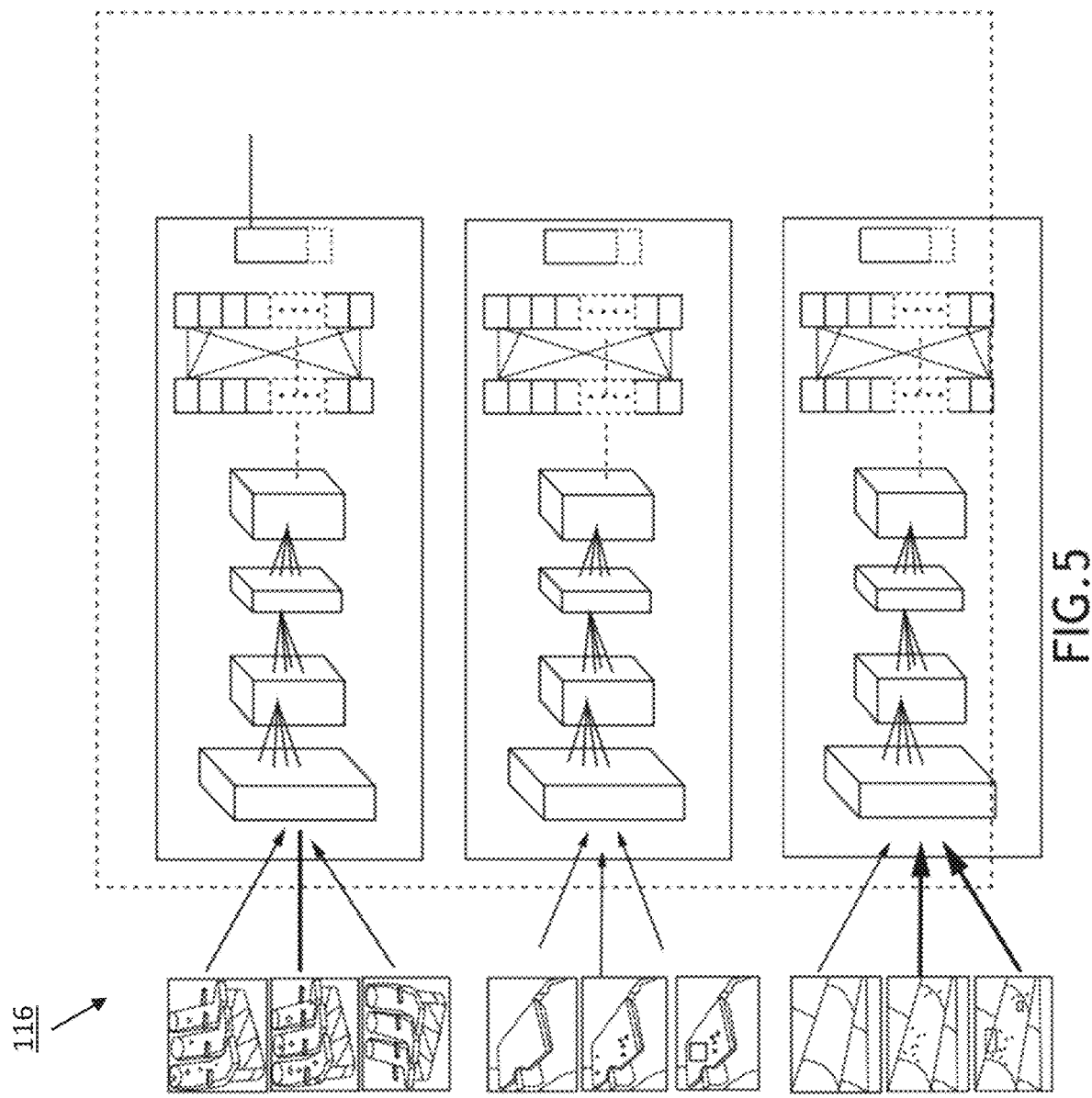
FIG. 5 is a diagram illustrating a training and validation of damage detection model according to the present disclosure.

Referring to FIG. 5, in a further aspect the performed analytics include damage detection analytics. Damage detection analysis may be performed upon request, for example, by a command input into the system which triggers a response. The command may be, for example, from maintenance personnel or other crew by either a maintenance device or crew management system. Damage detection analysis helps to identify damages to cabin equipment and assets such as seats, dress covers, in-flight entertainment equipment, tray tables, locks, overhead bins, bin locks, curtains, curtain hooks, partitions, sidewalls, windows, shades, carts, galleys, inserts, etc. Upon receipt of a damage detection analysis command, the system instructs the video cameras to capture live video feed of the observable area as per the configuration and capabilities of the cameras and provides the video for processing to the damage analytics module.

The damage analytics module 116, in receipt of the enhanced video stream, extracts the information related to degradation and damage of the assets and equipment from the live video feed and perform the analytics according to the trained model to generate data for output to the crew and/or maintenance personnel for handling, e.g., service, replacement, etc. Damage detection analysis may appear in the system menu as a selectable item on the crew and/or maintenance personnel device. Upon selection, the request is processed and on completion of the analytics the result and report are provided to the requesting device.

Similar to the safety procedures analytics modeling, the damage detection analytics modeling may also be divided into a training and validation phase and a field deployment phase. Referring to FIG. 5 illustrating the training and validation phase, assets such as seats, in-flight entertainment devices, tray table, overhead bins, curtains, etc., in different physical conditions are considered. For example, conditions may include 'damaged', 'degraded' and 'normal' as shown top-to-bottom order in FIG. 5 on the left for each observed object. Each of the different states of condition are provided for analytics model training and associated classification label. The different analytics models may be enabled and disabled using software configurations according to a particular airline carrier. Following training, the analytics models are validated for accuracy by providing new inputs and tested for accuracy of the classification under different scenarios, viewing angles, luminescence in the cabin, etc. The analytics models may be supplemented with additional training inputs and re-trained and provided with transformational learning until reaching a desired level of accuracy, e.g., a high level of accuracy. The analytics models may also be trained using augmented synthetic data to improve the accuracy of classification for damaged, degraded, and original.

Figure 6:
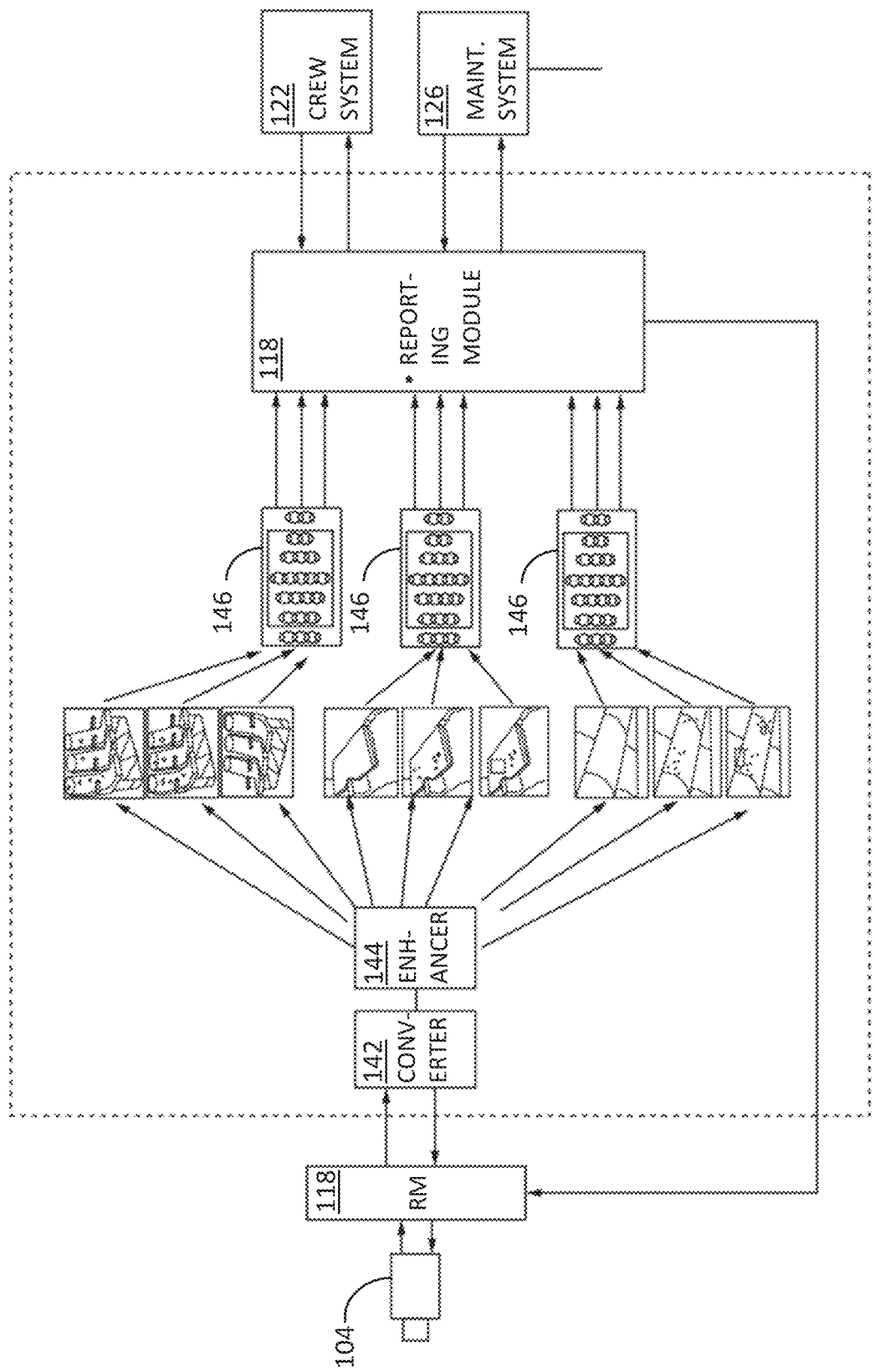
FIG. 6 is a diagram illustrating a real time deployment of damage detection analytics model according to the present disclosure.

FIG. 6 illustrates the damage analytics module 116 field deployment phase. In the field deployment phase, the trained and validated models are mature for field deployment and are uploaded to the computing device for co-deployment with the safety performance analytics module, in some embodiments. In a real-time scenario, if any damage or degradation is identified the maintenance personnel or the crew system may be provided with an alert, and in some cases further provided with a detailed maintenance recommendation for the maintenance activity. Similar to above, the live video feed from the at least one camera 104 is converted from video to image frame by a converter 142 and then enhanced by an enhancer 144, for instance from the concentrator and enhancer 118 as discussed above. Analytics models 146 are used to analyze the enhanced video images and generated data includes classifications such as normal, degraded, and damaged warranty an alert, service bulletin or replacement notice. Status, alerts, and reports are again generated by the reporting module 118 according to the classification and conveyed to the appropriate system(s), for instance the crew system 120 and the maintenance crew system 126.

System recognizable passenger seat damage may include, but is not limited to, broken closeouts, atypical incline, broken hardware, broken headrest, and seat not capable of returning to full upright. System recognizable dress cover damage may include, but is not limited to, torn dress cover, soiled dress cover, wet dress cover, and food or liquid standing on dress cover. System recognizable tray table damage may include damage tray table, atypical table angle, unlocked table, damaged lever, damaged lock, unserviceable lock, inability to stow, and stuck tray. System recognizable in-flight entertainment monitor may include, but is not limited to, power loss, screen flickering, overheating, broken buttons, and dirty screen. System recognizable overhead luggage bin damage may include, but is not limited to, broken door, loose door, bin door misalignment, inability to close, and broken lock. System recognizable window shade damage may include, but is not limited to, broken shade, torn shade, soiled shade, stuck shade, inoperable shade, cracked window, and dirty window. System recognizable curtain damage may include, but is not limited to, torn curtain, soiled curtain, curtain loose from hook, and broken hook. System recognizable partition damage may include, but is not limited to, broken partition, cracked partition, and soiled partition. System recognizable sidewall damage may include, but is not limited to, cracked sidewall and soiled sidewall. Recognizable beverage/food cart damage may include, but is not limited to, dented cart, broken wheel, and broken lock. System recognizable galley damage may include, but is not limited to, soiled galley, broken doors or drawers, and over-spilled appliances, damaged inserts, dented inserts, damaged locks, missing locks, and trash.

System analytics may further function to identify trash in the passenger cabin and gauge the level of cleanliness in the cabin and generate a cleaning recommendation based on the condition. In addition, the system can identify problem locations and special maintenance requirements inside the cabin.

Generally, according to the system, communications between the various devices and systems may be via wired or wireless communication protocols. Status indicators may be conveyed for predetermined objects in the observable area to indicate that any of safety norms are or are not followed (i.e., compliant, or non-compliant). Non-compliant may cause a status indicator to indicate an alert such that the flight crew can make a site visit and assist or take corrective action. For example, an 'OFF' state or inactive status may indicate all predetermined safety norms are followed. Different alerts may also be provided based on the severity of the status, and different severities may be linked to different actions to be taken by the crew. In some embodiments, a comprehensive non-compliance report may be generated for each flight associated with a tail number as required.

Benefits realized by implementing the system embodiments disclosed herein include, but are not limited to, reduced overhead for the flight crew, improved safety and upkeep of the aircraft cabin and cabin assets, quicker turnaround times between landing and takeoff, reduced anxiety for first time travelers, educational tutorials for first time travelers, guaranteed information to travelers, and alerts during TTOL flight phases. Further benefits include a configurable system such that additional analytical models can be introduced and upgraded (wired or wireless) in real time to implement new damage detections, scenarios, and safety issues. In addition, maintenance of aircraft becomes more cost effective as problems are identified and reported early.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An intelligent aircraft cabin management system, comprising:
   a plurality of video cameras each configured to capture video images of a predetermined portion of an observable area of a passenger cabin and output a live video stream;
   an enhancement module comprising processing circuitry configured to receive the live video streams, perform an enhancement operation on the live video streams, and output enhanced video streams;
   at least one analytics module comprising processing circuitry configured to receive the enhanced video streams, analyze the enhanced video streams to generate analytics data regarding at least one condition in the observable area and classify the generated analytics data; and
   a reporting module comprising processing circuitry configured to generate at least one of a status, an alert, and a report based on the classified generated analytics data and output the generated at least one status, alert, and report to at least one of an avionics system of the aircraft, a flight crew system of the aircraft, and a maintenance crew system,
   wherein the at least one analytics module includes a flight safety procedures analytics module and a damage analytics module, wherein the flight safety procedures analytics module is trained to identify instances of compliant and non-compliant conditions of at least one object in the observable area according to a predetermined flight phase, and wherein the damage analytics module is trained to identify instances of damage to at least one object in the observable area.

2. The system according to claim 1, wherein the avionics system is communicatively coupled to the at least one analytics module and comprises processing circuitry configured to output at least one of a current flight phase, flight parameters, and commands to the analytics module for consideration when analyzing the enhanced video streams.

3. The system according to claim 2, wherein the at least one analytics module includes in memory trained and validated analytics models directed to flight safety procedures and damage analytics and analyzes the enhanced video streams according to the trained models to generate the analytics data.

4. The system according to claim 3, wherein the at least one analytics module is configured to analyze the enhanced video stream to determine, according to the current flight phase, a position of the at least one object in the observable area, wherein the at least one object is at least one of a seat, a tray table, a seat belt, a window shade, and an overhead bin door, and the position is a taxi, takeoff, and landing-compliant position for the at least one object.

5. The system according to claim 3, wherein the reporting module is configured to generate the alert when the position of the at least one object is non-compliant according to the at least one analytics model directed to flight safety procedures and output the generated alert to the flight crew system of the aircraft as at least one of a visual and an audible alert.

6. The system according to claim 5, wherein the reporting module is further configured to calculate a severity of the at least one of the visual and the audible alert.

7. The system according to claim 3, further comprising in-flight entertainment devices located in the observable area, wherein the processing circuitry of the reporting module is further configured to output the generated alert to the in-flight entertainment device of the passenger seat associated with the generated alert.

8. A computer-implemented method for intelligent aircraft cabin management, comprising:
 capturing live video streams of an observable area in a cabin using a plurality of video cameras each assigned to a different portion of the observable area;
 concentrating and enhancing the captured live video streams, using a concentrator and enhancer module, to produce an enhanced live video stream;
 analyzing the enhanced live video stream, using at least one analytics module, to generate analytics data regarding at least one object in the observable area;
 classifying, using the analytics module, the generated analytics data;
 generating, using a reporting module, at least one of a status, an alert, and a report associated with the generated analytics data; and
 outputting, using the reporting module, the generated at least one status, alert, and report to at least one of an avionics system of the aircraft, a flight crew system of the aircraft, and a maintenance crew system of the aircraft or remote from the aircraft,
 wherein the analytics data regarding the at least one object in the observable area includes at least two of a position of the at least one object in the observable area, a working condition of the least one object in the observable area, and a damage condition of the at least one object in the observable area.

9. The method according to claim 8, wherein the avionics system is communicatively coupled to the at least one analytics module and outputs at least one of a current flight phase, flight parameters, and commands to the at least one analytics module for analytics model selection and consideration when analyzing the enhanced video streams.

10. The method according to claim 9, wherein the analytics module is configured to analyze the enhanced video stream to determine, according to the current flight phase, the position of the at least one object in the observable area, wherein the at least one object is at least one of a seat, a tray table, a seat belt, a window shade, and an overhead bin door, and the position is a taxi, takeoff, and landing-compliant position for the at least one object.

11. The method according to claim 9, wherein the method further comprises, using the reporting module, generating the alert when the position of the at least one object is non-compliant according to the analytics model directed to flight safety procedures and output the generated alert to the flight crew system of the aircraft as at least one of a visual and an audible alert.

12. The method according to claim 11, wherein the reporting module is further configured to calculate a severity of the at least one of the visual and the audible alert.

13. The method according to claim 8, wherein the at least one analytics module includes in memory trained and validated analytics models directed to flight safety procedures and damage analytics and analyzes the enhanced video streams according to the trained models to generate the analytics data.

* * * * *